United States Patent
Kean

(10) Patent No.: US 10,870,968 B2
(45) Date of Patent: Dec. 22, 2020

(54) WORK VEHICLE CONTROL SYSTEM PROVIDING COORDINATED CONTROL OF ACTUATORS

(71) Applicant: Deere & Company, Moline, IL (US)

(72) Inventor: Michael G. Kean, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 430 days.

(21) Appl. No.: 15/967,031

(22) Filed: Apr. 30, 2018

(65) Prior Publication Data
US 2019/0330823 A1 Oct. 31, 2019

(51) Int. Cl.
| | |
|---|---|
| *E02F 9/22* | (2006.01) |
| *E02F 3/43* | (2006.01) |
| *F15B 21/08* | (2006.01) |
| *G05B 15/02* | (2006.01) |
| *E02F 3/32* | (2006.01) |

(52) U.S. Cl.
CPC .............. *E02F 9/2203* (2013.01); *E02F 3/32* (2013.01); *E02F 3/435* (2013.01); *E02F 9/2271* (2013.01); *F15B 21/087* (2013.01); *G05B 15/02* (2013.01); *F15B 2211/6336* (2013.01); *F15B 2211/6656* (2013.01)

(58) Field of Classification Search
None
See application file for complete search history.

(56) References Cited

U.S. PATENT DOCUMENTS

| | | | | |
|---|---|---|---|---|
| 5,446,981 A | * | 9/1995 | Kamada | E02F 3/437 172/2 |
| 5,854,988 A | * | 12/1998 | Davidson | E02F 9/26 701/50 |
| 5,953,838 A | * | 9/1999 | Steenwyk | E02F 3/437 172/2 |
| 6,140,787 A | * | 10/2000 | Lokhorst | E02F 3/435 318/568.18 |
| 6,233,511 B1 | * | 5/2001 | Berger | E02F 3/432 414/699 |
| 6,336,067 B1 | * | 1/2002 | Watanabe | E02F 9/2228 37/414 |
| 6,609,315 B1 | * | 8/2003 | Hendron | E02F 3/28 37/348 |
| 6,655,465 B2 | * | 12/2003 | Carlson | E02F 3/847 172/4.5 |
| 6,691,437 B1 | * | 2/2004 | Yost | E02F 3/435 356/141.2 |

(Continued)

FOREIGN PATENT DOCUMENTS

| | | |
|---|---|---|
| DE | 4009163 A1 | 9/1991 |
| DE | 112015000043 B4 | 2/2019 |

OTHER PUBLICATIONS

German Search Report issued in counterpart application No. 102019205971.6 dated Mar. 12, 2020 (8 pages).

*Primary Examiner* — Jonathan M Dager
(74) *Attorney, Agent, or Firm* — Klintworth & Rozenblat IP LLP

(57) ABSTRACT

A control system and a method of synchronously operating a plurality of actuators of a work vehicle in a coordinated operation to move an implement. The method includes determining an acceleration parameter for the actuators based at least partly on a control effort associated with the control commands sent to the actuators.

20 Claims, 7 Drawing Sheets

(56) References Cited

U.S. PATENT DOCUMENTS

| | | | | |
|---|---|---|---|---|
| 6,898,502 B2* | 5/2005 | Watanabe | E02F 3/435 | |
| | | | 172/75 | |
| 7,010,367 B2* | 3/2006 | Koch | E02F 9/2004 | |
| | | | 700/83 | |
| 7,114,430 B2* | 10/2006 | Reedy | F15B 15/2838 | |
| | | | 91/392 | |
| 7,797,860 B2* | 9/2010 | Schoenmaker | E02F 3/439 | |
| | | | 37/348 | |
| 7,844,379 B2 | 11/2010 | Tang et al. | | |
| 8,145,355 B2 | 3/2012 | Danko | | |
| 8,155,781 B2* | 4/2012 | Birzer | G05B 19/4103 | |
| | | | 700/189 | |
| 8,200,398 B2* | 6/2012 | Sahlin | E02F 3/847 | |
| | | | 701/50 | |
| 8,204,623 B1* | 6/2012 | Bhattacharyya | B25J 9/1666 | |
| | | | 700/245 | |
| 8,311,710 B2* | 11/2012 | Budde | E02F 9/265 | |
| | | | 701/50 | |
| 8,355,847 B2* | 1/2013 | Colwell | E02F 3/432 | |
| | | | 701/50 | |
| 8,467,904 B2* | 6/2013 | Dariush | G06T 7/277 | |
| | | | 700/262 | |
| 8,527,158 B2* | 9/2013 | Faivre | E02F 9/265 | |
| | | | 701/50 | |
| 8,577,564 B2* | 11/2013 | Stanek | E02F 9/2037 | |
| | | | 701/50 | |
| 8,644,964 B2* | 2/2014 | Hendron | G05B 11/01 | |
| | | | 700/56 | |
| 8,965,582 B2* | 2/2015 | Pechev | B25J 9/1607 | |
| | | | 700/263 | |
| 9,031,750 B2* | 5/2015 | Miyoshi | B66C 13/18 | |
| | | | 701/50 | |
| 9,260,834 B2* | 2/2016 | Lee | E02F 3/425 | |
| 9,458,581 B1 | 10/2016 | Schaeding | | |
| 9,464,405 B2* | 10/2016 | Friend | B33Y 50/02 | |
| 9,540,789 B2* | 1/2017 | Urbanowicz | E02F 9/123 | |
| 9,562,341 B2* | 2/2017 | Voelz | E02F 3/308 | |
| 9,752,298 B2* | 9/2017 | Nakamura | E02F 9/2029 | |
| 9,783,952 B2* | 10/2017 | Nagato | G07C 5/0841 | |
| 10,459,462 B2* | 10/2019 | Beschorner | E02F 9/264 | |
| 10,494,788 B2* | 12/2019 | Glasser | E02F 3/435 | |
| 2003/0001751 A1* | 1/2003 | Ogura | E02F 9/26 | |
| | | | 340/691.6 | |
| 2004/0267404 A1* | 12/2004 | Danko | E02F 3/438 | |
| | | | 700/245 | |
| 2005/0004734 A1* | 1/2005 | Cripps | E02F 3/435 | |
| | | | 701/50 | |
| 2005/0049838 A1* | 3/2005 | Danko | G06F 17/13 | |
| | | | 703/2 | |
| 2005/0080495 A1* | 4/2005 | Tessier | B64C 13/503 | |
| | | | 700/63 | |
| 2006/0245896 A1* | 11/2006 | Alshaer | E02F 9/2029 | |
| | | | 414/685 | |
| 2007/0119159 A1* | 5/2007 | Egelja | E02F 9/2228 | |
| | | | 60/420 | |
| 2007/0168100 A1* | 7/2007 | Danko | E02F 9/2004 | |
| | | | 701/50 | |
| 2007/0255454 A1* | 11/2007 | Dariush | G06N 3/008 | |
| | | | 700/245 | |
| 2009/0204259 A1* | 8/2009 | Danko | G05B 17/02 | |
| | | | 700/250 | |
| 2009/0319133 A1* | 12/2009 | Ekvall | F15B 21/087 | |
| | | | 701/50 | |
| 2011/0029206 A1* | 2/2011 | Kang | E02F 9/2095 | |
| | | | 701/50 | |
| 2011/0029279 A1* | 2/2011 | McAree | E02F 3/47 | |
| | | | 702/150 | |
| 2012/0187754 A1* | 7/2012 | Emerson | E02F 9/207 | |
| | | | 307/9.1 | |
| 2019/0226175 A1* | 7/2019 | Mairet | E02F 3/431 | |
| 2019/0390436 A1* | 12/2019 | Tanaka | E02F 3/437 | |
| 2020/0181870 A1* | 6/2020 | Nakano | E02F 3/435 | |

* cited by examiner

WORK VEHICLE CONTROL SYSTEM PROVIDING COORDINATED CONTROL OF ACTUATORS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to the control of a work vehicle and, more particularly, relates to a work vehicle control system that provides coordinated control of actuators.

BACKGROUND OF THE DISCLOSURE

Work vehicles may have one or more implements for carrying out various work operations. Excavators, for example, may include a bucket that is attached to a frame of the work vehicle via a moveable linkage or arm. The arm may include a boom and a stick, which may be supported for independent movement. The frame may also be pivotally attached to an undercarriage for rotation about a vertical axis.

Various actuators may be included for moving the arm, the bucket, and/or the frame. A control system may be included for coordinating movement of the actuators. However, existing control systems may cause the implement to move relatively slowly, inefficiently, or inaccurately, often in a sequential or step-wise fashion, to the detriment of the overall work vehicle operation.

SUMMARY OF THE DISCLOSURE

This disclosure provides a system for controlling a plurality of actuators for moving an implement of a work vehicle.

In one aspect the disclosure provides a method of synchronously operating a plurality of actuators of a work vehicle to move an implement. The method includes receiving, by a processor of a control system of the work vehicle, an operation selection. The operation selection has an associated set of velocity ratios dictating relative velocities of the plurality of actuators. Also, the method includes actuating, by the processor, the plurality of actuators according to a first plurality of control signals for a first time step. The first plurality of control signals is based at least in part on the set of velocity ratios. The method further includes determining, by the processor, a limiting one of the plurality of actuators for the first time step. The limiting one is determined according to a control effort proportion. Moreover, the method includes determining, by the processor, an acceleration parameter for the limiting one of the plurality of actuators. Also, the method includes actuating, by the processor, the plurality of actuators according to a second plurality of control signals for a second time step. The second plurality of control signals is based at least in part on the acceleration parameter.

In another aspect, the disclosure provides a work vehicle that includes a plurality of actuators and an implement. The work vehicle also includes a control system configured to selectively actuate the plurality of actuators in synch to move the implement. The control system is configured to receive an operation selection. The operation selection corresponds to a movement of the implement from a start position to an end position, and the operation selection has an associated set of velocity ratios dictating relative velocities of the plurality of actuators. The control system is also configured to actuate the plurality of actuators according to a first plurality of control signals for a first time step. The first plurality of control signals are based at least in part on the set of velocity ratios. Furthermore, the control system is configured to determine a limiting one of the plurality of actuators for the first time step. The limiting one is determined according to a control effort proportion. Additionally, the control system is configured to determine an acceleration parameter for the limiting one of the plurality of actuators. Moreover, the control system is configured to actuate the plurality of actuators according to a second plurality of control signals for a second time step. The second plurality of control signals are based at least in part on the acceleration parameter.

Another aspect of the disclosure provides a method of performing an operation with a work vehicle having an implement. The method includes generating, by a processor of a control system, a first control signal for a first actuator and a second control signal for a second actuator for a first time step of the operation. The method includes actuating the first actuator according to the first control signal and the second actuator according to the second control signal for the first time step. The method also includes determining, by the processor, a first control effort associated with the first control signal for the first time step and determining, by the processor, a second control effort associated with the second control signal for the first time step. Furthermore, the method includes determining, by the processor, a first control proportion of the first time step for the first actuator and a second control proportion of the first time step for the second actuator. The first control proportion is the determined first control effort divided by a predetermined first limit of the first actuator, and the second control proportion is the determined second control effort divided by a predetermined second limit of the second actuator. The method also includes determining, by the processor, an acceleration parameter according to a greater one of the first control proportion and the second control proportion. Moreover, the method includes generating, by the processor, a first augmented control signal for the first actuator and a second augmented control signal for the second actuator based at least partly on the determined acceleration parameter. Additionally, the method includes actuating the first actuator according to the first augmented control signal for the second time step and actuating the second actuator according to the second augmented control signal for the second time step.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
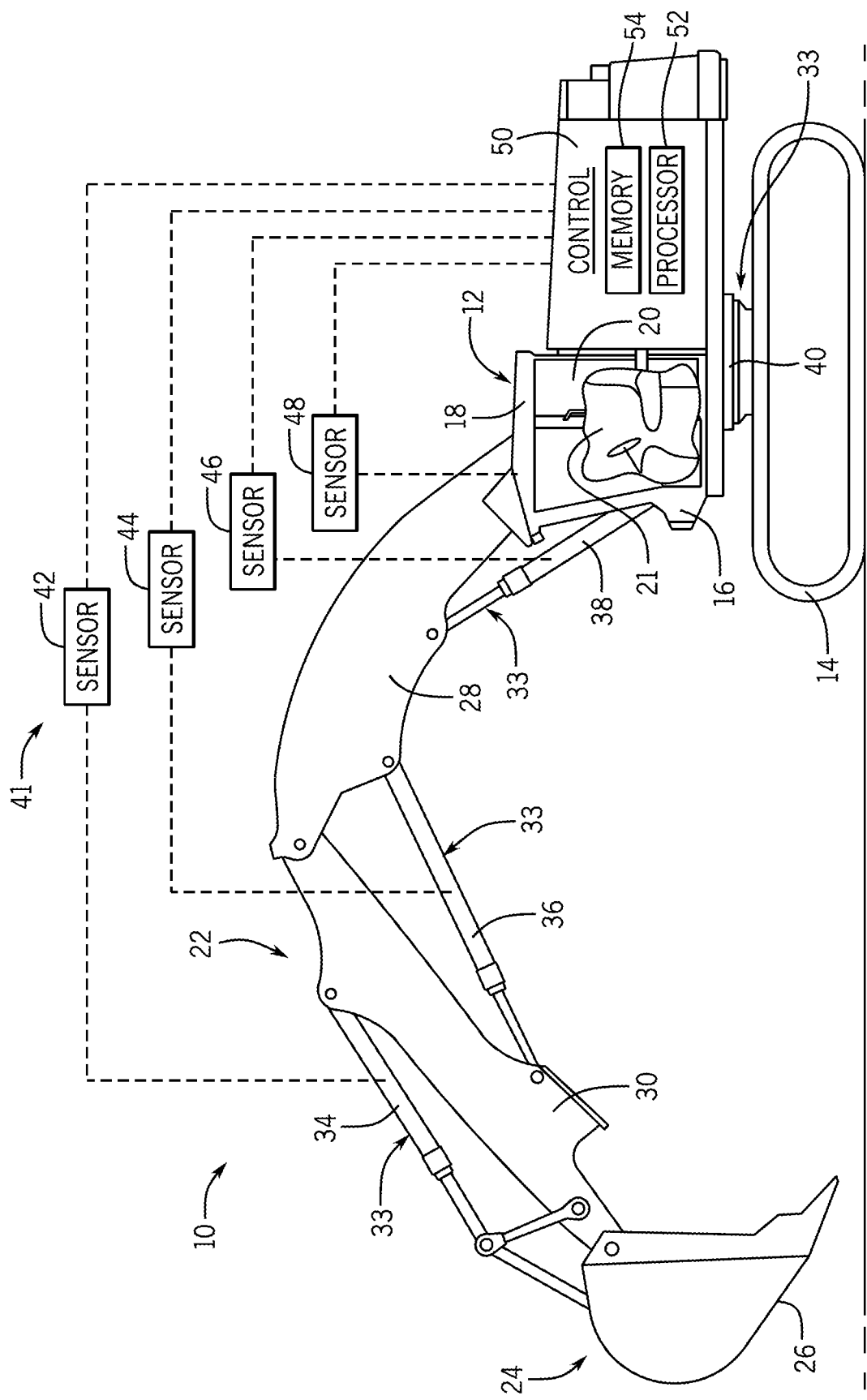
FIG. 1 is an isometric view of a work vehicle with a control system according to example embodiments of the present disclosure.

The following describes one or more example embodiments of the disclosed coordinated actuator control system, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "aft," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The following describes one or more example implementations of the disclosed system for controlling plural actuators of a work vehicle. The disclosed control system, the method of operation, and the work vehicle associated therewith allow for improved coordinated and synchronous actuation of the actuators, as compared to conventional systems.

Generally, an implement may be movable by various actuators to accomplish various work operations. Discussion herein may sometimes focus on an excavator with a bucket and associated actuators. However, the present disclosure may also apply to other work vehicles and/or other implements.

The disclosed control system may be used to generate control signals for multiple actuators of a work vehicle. The control signals may cause the actuators to simultaneously actuate to perform an operation, such as moving an implement along a trajectory from a start position to an end position. For example, the actuators may simultaneously actuate to move an excavator bucket upward from the ground and over a dump truck. During the operation, at least one actuator is controlled to move at velocities that are close to its particular capacity. That actuator may be referred to as a "limiting actuator". The control system may seek to maintain the maximum controller command within a control deadband for the limiting actuator. The control system may accelerate or decelerate the limiting actuator to maintain this state, and the control system may accelerate the other actuators proportionately. This process may be repeated over the course of the operation. Accordingly, the operation may be completed efficiently and in a relatively short amount of time.

In some embodiments, the control system may associate a particular operation with a trajectory parameter (S). The control system may use the trajectory parameter (S) for synchronizing the plurality of actuators, and movement of plurality of actuators may be nondimensionalized and parameterized as a function of the trajectory parameter (S). For example, the trajectory parameter (S) at the start position may be assigned a value of zero (0) and may be assigned a value of one (1) at the end position. The value of the trajectory parameter (S) may change from zero (0) to one (1) over the course of the operation. The control system may synchronize the actuators according to this changing trajectory parameter (S) to complete the operation.

In some embodiments, an operation is selected and the control system retrieves associated predetermined data for the selected operation. For example, the control system may receive velocity ratios for the actuators to begin the operation and move the implement from the start position. In one time period (i.e., time step) of the operation, the control system generates and sends a set of control commands to the actuators according to the velocity ratios. The control system may monitor the resulting control efforts (the amount of power/energy sent from the control system to the individual actuators) associated with that set of commands. The control system may determine an acceleration parameter according to the control efforts, and the acceleration parameter may be applied to the control commands for a subsequent time step. As a result, the velocity of the actuators may be changed.

The acceleration parameter may be determined in various ways. For example, the control system may determine how much the actual control effort deviates from a target control effort, and the acceleration parameter may be determined as a function of this deviation. The acceleration parameter may be applied to the control command for the limiting actuator. The acceleration parameter may be applied to the control commands for the other actuators as well. The control system may repeat this process for each time step until the operation is completed and the implement reaches its end position.

With reference to the drawings, one or more example implementations of the present disclosure will now be described. While an excavator is illustrated and described herein as an example work vehicle, one skilled in the art will recognize that principles of the control system and the methods disclosed herein may be readily adapted for use in other types of work vehicles. As such, the present disclosure should not be limited to applications associated with excavators or the particular example excavator shown and described.

FIG. 1 illustrates a work vehicle 10 in the form of an excavator 12. The work vehicle 10 may generally include an undercarriage 14 and a frame 16 supported on the undercarriage 14. The work vehicle 10 may also include a cab 18 with an operator cabin 20 that is supported on the frame 16. The operator cabin 20 may provide an enclosure for an operator seat and an operator console for mounting various operator control devices 21 (e.g., joystick(s), steering wheel, accelerator and brake pedals, dials, buttons, etc.), communication equipment, an operator interface providing graphical (or other) input controls and feedback, and other instruments used in the operation of the excavator 12.

The work vehicle 10 may further include a linkage arm 22 with one end attached to the frame 16 and an opposite end supporting an implement 24. In some embodiments, the implement 24 may include a bucket 26. The arm 22 may comprise a boom 28 and a stick 30.

The work vehicle 10 may further include a plurality of actuators 33 (i.e., an actuator system). There may be any number of actuators 33. In some embodiments, the plurality of actuators 33 may include a first actuator 34, a second actuator 36, a third actuator 38, and a fourth actuator 40. The first actuator 34 may be configured for rotating the bucket 26 relative to the stick 30. The second actuator 36 may be configured for rotating the stick 30 relative to the boom 28.

The third actuator 38 may be configured for rotating the boom 28 relative to the frame 16. The fourth actuator 40 may be configured for rotating the frame 16 relative to the undercarriage 14.

The actuators 33 may include any suitable type of actuator. In some embodiments, the first actuator 34, the second actuator 36, and the third actuator 38 may be configured as linear actuators. Also, in some embodiments, the fourth actuator 40 may be configured as a rotational actuator. In some embodiments, one or more of the actuators 33 may comprise a hydraulic actuator. Furthermore, in some embodiments, at least one of the actuators 33 may comprise an electric motor, a pneumatic actuator, or other type of actuator.

In embodiments in which the actuators 33 comprise hydraulic actuators, there may be one or more hydraulic pumps that are driven by the engine of the excavator 12. Flow from the pumps may be routed through various control valves via various conduits (e.g., flexible hoses) in order to drive the hydraulic drives and cylinders of the actuators 33. The flow from the pumps may be controlled in various ways (e.g., through control of various control valves) in order to cause selective movement of the actuators 33. Specifically, in some embodiments, electro-mechanical devices (e.g., solenoids) may be used to control movement of the valves to selectively move the actuators 33.

The work vehicle 10 may further include a control system 50, which may be used for selective control and actuation of the actuators 33. As will be discussed, the control system 50 may generate and send individual control commands to the actuators 33. In some embodiments, the control system 50 may send control commands for moving the different hydraulic valves, electric motors, etc. associated with the different actuators 33 so that the actuators 33 actuate to move the bucket 26.

In some embodiments, the control system 50 may operatively connect the operator control devices 21 (joysticks, pedals, etc.) within the operator cabin 20 to the actuators 33 so that the control system 50 provides manual control of the bucket 26. In other words, the operator control devices 21 provide control inputs to the control system 50, which cooperates to control the various actuators 33 (e.g., by controlling electro-hydraulic control valves to actuate the various actuators 33 of a hydraulic circuit).

In additional embodiments, the control system 50 may control the work vehicle 10 autonomously. Thus, the control system 50 may control the actuators 33 without input from a human operator. In further embodiments, the control system 50 may alternatively provide manual or automatic control depending on operating conditions. Moreover, the control system 50 may provide a combination of manual and automatic control for certain operations.

The control system 50 (or others) may be configured as a computing device with one or more processors 52 and one or more memory elements 54. The control system 50 may be configured as a hard-wired computing circuit (or circuits), a programmable circuit, a hydraulic controller, an electrical controller, an electro-hydraulic controller, or otherwise. As such, the controller 50 may be configured to execute various computational and control functionality with respect to the work vehicle 10. In some embodiments, the control system 50 may be configured to receive input signals in various formats (e.g., as hydraulic signals, voltage signals, current signals, and so on) and to output command signals in various formats (e.g., as hydraulic signals, voltage signals, current signals, mechanical movements, and so on). In some embodiments, the control system 50 (or a portion thereof)

may be configured as an assembly of hydraulic components (e.g., valves, flow lines, tanks, and so on), such that control of various devices (e.g., pumps or motors) may be affected with, and based upon, hydraulic, mechanical, or other signals and movements.

The control system 50 may, thus, send control commands to the actuators 33 for changing and controlling the position of the bucket 26. It will be appreciated that the control system 50 may also send control commands to an engine of the work vehicle 10, to a braking system, to a steering system, and/or other components of the work vehicle 10.

The control system 50 may additionally include a plurality of sensors 41 (i.e., a sensor system). One or more sensors 41 may also be provided to observe and detect various conditions associated with the actuators 33. For example, there may be at least one first sensor 42 that observes the position (e.g., the current length) of the first actuator 34 and/or the current actuation velocity of the first actuator 34. In some embodiments, the first sensor 42 may observe both the current position and current velocity of the first actuator 34. Thus, in some embodiments, the first sensor 42 may collectively comprise a position sensor and a velocity sensor. In further embodiments, the first sensor 42 may observe multiple positions of the first actuator 34 and the actuation velocity may be derived from the observed positions. The work vehicle 10 may further include a similar second sensor 44, which is configured to observe the position and/or velocity of the second actuator 36. Likewise, the work vehicle 10 may include a similar third sensor 46, which is configured to observe position and/or velocity of the third actuator 38. Additionally, the work vehicle 10 may include a fourth sensor 48 that is configured to observe position and/or velocity of the fourth actuator 40.

The control system 50 may be in electronic, hydraulic, mechanical, or other communication with the actuators 33, the sensors 41, and/or other systems or devices of the work vehicle 10. For example, the control system 50 may be in electronic or hydraulic communication with the pumps, control valves, etc. of the actuators 33. The control system 50 may communicate with the actuators 33, sensors 41, and/or other systems in various known ways, including via a CAN bus (not shown) of the work vehicle 10, via wireless communication, hydraulic communication means, or otherwise. Furthermore, although the control system 50 is shown on board the work vehicle 10 in FIG. 1, it will be appreciated that one or more features of the control system 50 may be located remotely from the work vehicle 10 to allow for remote control thereof.

Figure 2:
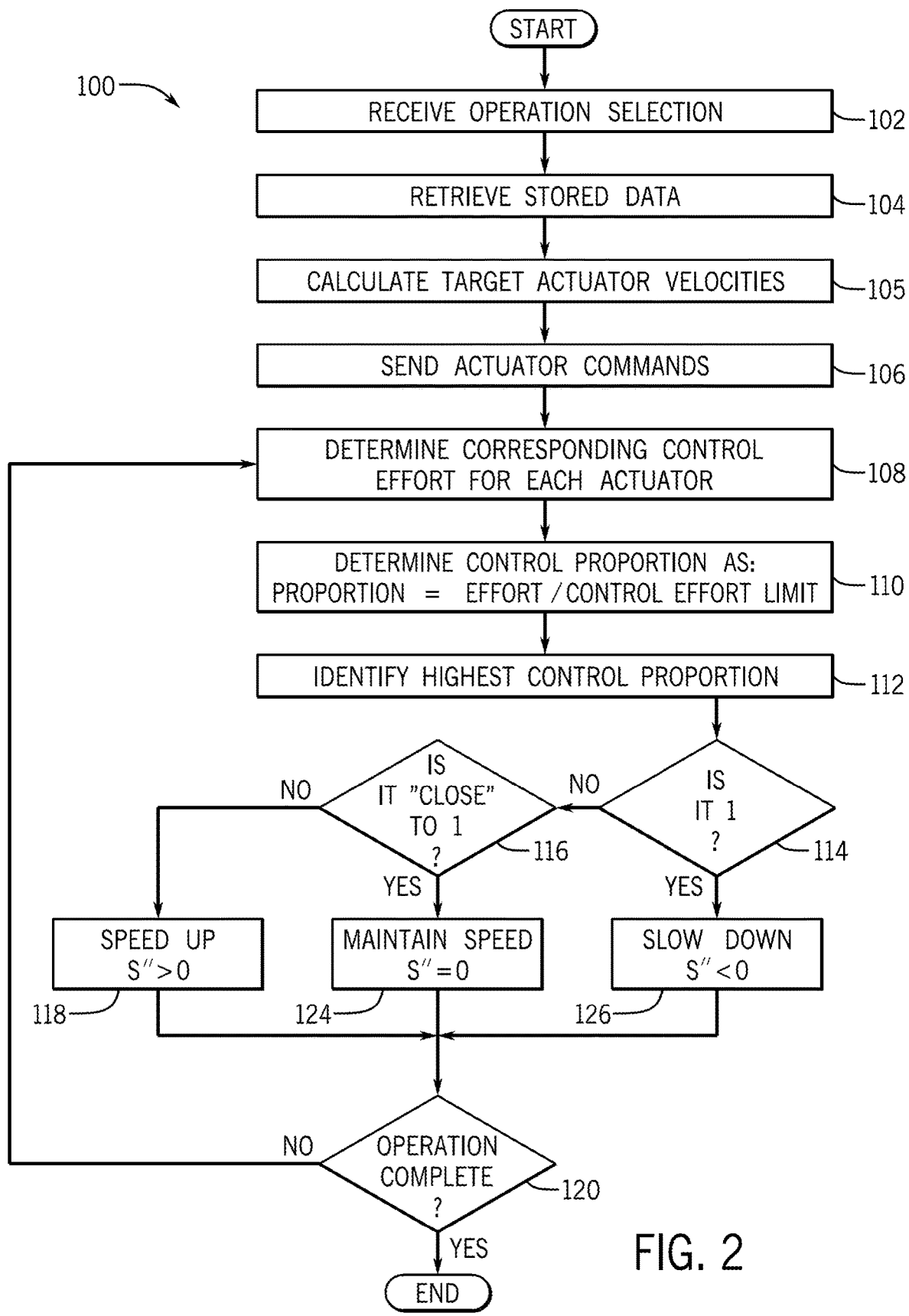
FIG. 2 is a flowchart illustrating a method of controlling the work vehicle according to example embodiments of the present disclosure.

Referring now to FIG. 2, a method 100 of operating the work vehicle 10 will be discussed according to example embodiments. The method 100 may be employed at certain times during the operation of the work vehicle 10.

The method 100 may begin at 102 at which the processor 52 may receive an operation selection. The operation selection may correspond to a particular movement of the bucket 24 along a particular trajectory from a starting position (e.g., proximate the ground) to an end position (e.g., above a dump truck). In some embodiments, the selection may be manually input at 102 using one of the operator control devices 21. In other embodiments, the selection may be automatically and/or autonomously input (i.e., determined by the processor 52). As an example for discussion, it will be assumed that the operation selected at 102 is a "lift-and-swing" operation. The "lift-and-swing" operation may include simultaneous extension of the actuator 38 to raise the boom 28 a predetermined distance, extension of the actuator 34 a predetermined distance to keep the bucket 26 level with the ground, and swinging the cab 18 a predetermined angular distance.

Then, at 104, the control system 50 may retrieve saved data that corresponds to the selection made at 102. The data may be saved and stored in the memory element 54. The data may be of various types. In some embodiments, the data retrieved at 104 may include a lookup table, an algorithm, a plot or other data that relates to target actuator velocities. Furthermore, the data may include a velocity parameter (S') and predetermined velocity ratios for the various actuators. The velocity ratios may dictate how fast the actuators 33 move relative to each other. The velocity ratio may remain constant over the course of the operation from the start position to the end position, or the velocity ratio may change over the course of the operation. Continuing the example, the data received at 104 may include an initial velocity parameter of 0.1 cycle per second (S'=0.1 cycle/sec) and velocity ratios that dictate that the first actuator 34, the third actuator 38, and the fourth actuator 40 may move, respectively, at 250 mm/cycle, 1000 mm/cycle, and 3000 mm/cycle relative to each other to complete the selected "lift-and-swing" operation.

Next, at 105, the processor 52 may calculate target velocities for the actuators 33. The processor 52 may calculate the target velocities by multiplying together the initial velocity parameter and the velocity ratios obtained at 104. Continuing the present example, the target velocity for the first actuator 34 may be 25 mm/s, the target velocity for the third actuator 38 may be 100 mm/s, and the target velocity for the fourth actuator 40 may be 300 RPM.

Then, at 106, the processor 52 may generate and send actuator commands to the different actuators 33 according to the target velocities calculated at 105. Again, the command to the first actuator 34 would cause the first actuator 34 to move at 25 mm/s, the third actuator 38 to move at 100 mm/s, and the fourth actuator 40 to move at 300 RPM. The first, third, and fourth actuators 34, 38, 40 may begin to actuate substantially simultaneously in some embodiments to begin the "lift-and-swing" operation.

Next, at 108, the control system 50 may determine the control efforts for the different actuators 34, 38, 40. In other words, the control system 50 may monitor and detect how much control effort went to moving the first actuator 34 at 25 mm/s, how much control effort went to moving the third actuator 38 at 100 mm/s, and how much control effort went to moving the fourth actuator at 300 RPM. Continuing this example, at 108, the processor 52 may determine that the control effort for the first actuator 34 is 4.5 V, the control effort for the third actuator 38 is 400 mA, and the control effort for the fourth actuator 40 is 60% duty cycle.

Next, at 110, the processor 52 may determine a control proportion for the different actuators 33. For example, in some embodiments, the processor 52 may calculate the control proportions as the control effort (determined at 108) divided by the corresponding control effort limit. The control effort limit may be the maximum command that the particular actuator may take, for example, without damaging the actuator, the connected structures, etc. The control effort limits may be predetermined and stored in the memory element 54 for each actuator 33. Continuing the example, the control effort limit for the first actuator 34 may be five volts (5 V), the control effort limit for the third actuator 38 may be one thousand milliamps (1000 mA), and the control effort limit for the fourth actuator 40 may be 100% duty cycle. Accordingly, at 108, the processor 52 may calculate the control proportion for the first actuator 34 as 0.9. The processor 52 may also calculate the control proportion for the third actuator 38 as 0.4. The processor 52 may additionally calculate the control proportion for the fourth actuator 40 as 0.6.

Subsequently, at 112, the processor 52 may identify the highest of the control proportions determined at 110. In other words, the processor 52 identifies a "limiting actuator" because it is moving closest to its highest potential. Here, in the current example, the control proportion of the first actuator 34 is highest. Therefore, at 112, the processor 52 identifies the first actuator 34 as the "limiting actuator" among all of the actuators 33 involved in performing the operation selected at 102.

At this point in the method 100, the processor 52 determines how much the control proportion deviates from a predetermined target proportion. The processor 52 then determines an acceleration parameter (S") as a function of the calculated deviation. The acceleration parameter (S") may be used for speeding up and accelerating the actuators 33, slowing down and decelerating the actuators 33, or maintaining the current velocity of the actuators 33. Various functions may be used for determining the acceleration parameter (S").

For example, at 114, the processor 52 may determine if the control proportion of the limiting actuator is equal to one (i.e., low deviation and/or actuator moving at 100% capacity). In the current example, the control proportion of the limiting actuator (the first actuator 34) is 0.9. Thus, the processor 52 has a negative determination at 114, and the method 100 continues to 116.

At 116, the processor 52 may determine if the control proportion of the limiting actuator falls within a predetermined deviation threshold (i.e., within a predetermined deviation range and/or within a predetermined range of 100% capacity). The predetermined deviation threshold may have any suitable value and may correspond to a control deadband. The deviation threshold may also be stored in the memory element 54 and the processor 52. The processor 52 may retrieve the threshold and compare it to the control proportion of the limiting actuator to make the determination at 116. In the current example, it will be assumed that the predetermined deviation threshold is 0.05 (i.e., at or above 95% capacity). Here, the control proportion of the limiting actuator is 0.10 (i.e., 90% capacity). Thus, because the control proportion of the limiting actuator is outside the threshold (negative determination at 116), the method may continue to 118.

At 118, the processor 52 may determine that the actuators 33 should accelerate. In general, the processor 52 generates actuator control commands for one or more subsequent time steps that cause the limiting actuator to accelerate and increase in actuation velocity. In some embodiments, the limiting actuator accelerates to a velocity corresponding to "full command" and that velocity is maintained through multiple time steps through the operation. In other words, at 118, the limiting actuator (here, the first actuator 34) may accelerate to an updated target velocity and actuate closer to full capacity.

Also, the processor 52 generates actuator control commands for the other actuators (i.e., the actuator(s) 33 other than the limiting actuator identified at 112). In some embodiments, the processor 52 accelerates these other actuators proportionately to the accelerations of the limiting actuator. In some embodiments, the other actuators may be accelerated to a ratiometric velocity corresponding to the updated target velocity of the limiting actuator.

In particular, at 118, the processor 52 may determine the acceleration parameter (S") for speeding up and accelerating the actuators 33. The acceleration parameter (S") may have a positive, non-zero value in some embodiments. The acceleration parameter (S") may be calculated in various ways without departing from the scope of the present disclosure. Once the acceleration parameter (S") is determined, it may be applied to the actuator control commands for a subsequent time step of the operation.

In the continuing example, the processor 52 may calculate the acceleration parameter (S") to be 0.1 cycle/sec$^2$. This parameter may be applied to the control commands to be sent out to the first actuator 34 during a subsequent time step (n+1) of the operation. The time step may be one second (1 sec) in some embodiments. The processor 52 may calculate an updated velocity parameter (S') for a subsequent time step. In some embodiments, the updated velocity parameter may be calculated according to:

$$S'_{n+1}=S'_n+S''(\text{time step}) \quad (1)$$

In additional embodiments, the updated velocity parameter may be calculated according to:

$$S'_{n+1}=S'_n+S''(\text{time step})-\text{LEAK} \quad (2)$$

where LEAK represents bias of the control system or other source. However, for purposes of simplicity, it will be assumed that LEAK is equal to zero (LEAK=0).

Thus, the velocity parameter for the subsequent time step may be updated to 0.2 cycles/sec. Updated commands may be generated and sent to the first actuator 34, the third actuator 38, and the fourth actuator 40 according to the updated velocity parameter. Assuming that the velocity ratios for the actuators remain the same as in the previous time step (e.g., 250 mm/cycle for the first actuator 34, 1000 mm/cycle for the third actuator 38, and 3000 RPM/cycle for the fourth actuator 40), the updated target velocities for the actuators 33 during the subsequent time step ($S'_{n+1}$) may be 50 mm/cycle for the first actuator 34, 200 RPM for the third actuator 38, and 600 RPM for the fourth actuator 40.

The method 100 may continue to 120, at which the processor 52 may determine whether the operation (selected at 102) is completed and the bucket 26 is at the end position. If not (negative determination at 120), then the method 100 may loop back to 108. If, instead, the operation is complete (affirmative determination at 120), then the method 100 may terminate.

If, at 116, the processor 52 determines that the highest control proportion (determined at 112) is within the predetermined deviation threshold (affirmative determination at 116), then the method 100 may continue to 124. At 124, the processor 52 may calculate the acceleration parameter (S") as being equal to zero and maintain the same velocity of the actuators 33 through the next time step. The commands to the actuators 33 may be substantially similar to the previous time step. Then, the method may continue to 120 as discussed above.

If, at 114, the processor 52 determines that the highest control proportion (determined at 112) is equal to 1 (affirmative determination at 114), then the method 100 may continue to 126.

At 126, the processor 52 may determine that the actuators 33 associated with the highest control proportion (as determined at 112) should be decelerated because it is working too close to full capacity. The processor 52 may determine the acceleration parameter (S") for slowing down and decelerating the actuators 33. The acceleration parameter (S") may have a negative value (below zero) in some embodiments. Once the acceleration parameter (S") is determined, it may be applied to the actuator control commands for the subsequent time step of the operation. Accordingly, the limiting actuator may decelerate. Then, the method may continue to 120 as discussed above. Again, once the processor 52 determines that the operation is complete and the bucket 26 is at its end position, the method 100 may terminate.

Figure 3:
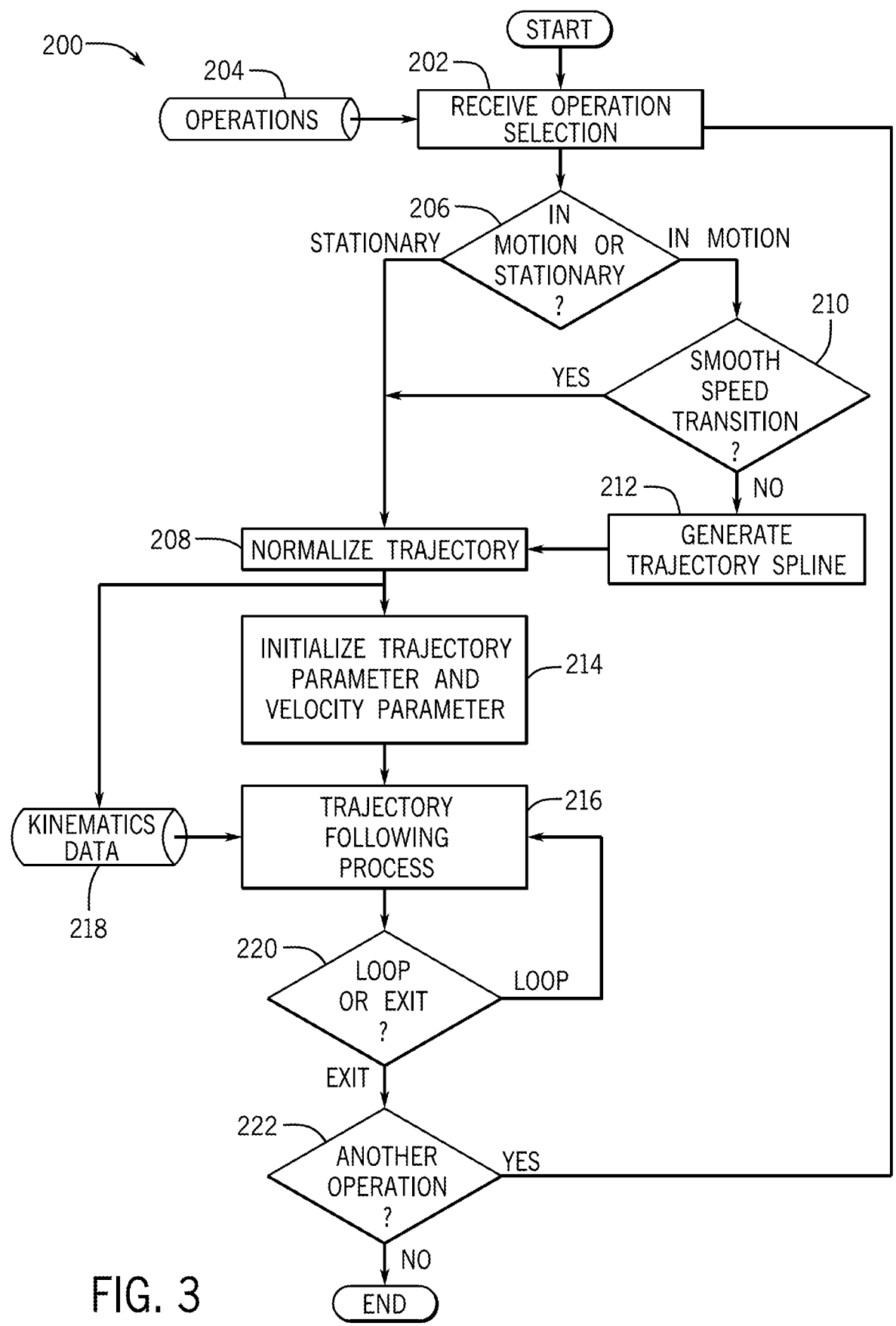
FIG. 3 is a flowchart illustrating a method of controlling the work vehicle according to example embodiments of the present disclosure.

Referring now to FIG. 3, a method 200 of operating the work vehicle 10 will be discussed according to additional example embodiments. The method 200 may correspond to the method 100 of FIG. 2 in some aspects.

The method 200 may begin at 202, wherein an operation is selected. This portion of the method 200 may correspond to 102 of the method 100 of FIG. 2. Accordingly, the operation may include moving the bucket 26 from a start position to an end position. The operations may be characterized by a specific trajectory having a start position and an end position of the bucket 26. In some embodiments, there may be a plurality of preset operations (each with different associated trajectories for the bucket 26, etc.) that are available from an operations bank 204 within the memory device 54. The user may select from the operations available from the bank 204 to make the selection at 202.

Next, at 206, the control system 50 may determine whether one or more of the actuators 33 is already in motion from a previous operation. In some embodiments, the processor 52 may rely on signals from the sensors 41 to make this determination. If the actuators 33 are already in motion, the method 200 may continue to 210.

At 210, the control system 50 may determine whether the trajectory of the previous operation smoothly blends into the trajectory for the operation selected at 202. If not (negative determination at 210), then the method 200 may continue at 212. At 212, the processor 52 may generate a trajectory spline for blending the previous trajectory into the trajectory for the operation selected at 202. For example, the processor 52 may apply a cubic spline algorithm to the two trajectories for smoothing the transition. Then, the method may continue at 208, which will be described below. If, at 210, the control system 50 determines that the transition is sufficiently smooth, then, the method 200 may bypass the splining of 212 and continue directly to 208. Likewise, if at 206 the control system 50 determines that the actuators 33 are stationary, the method 200 may bypass both the determination of 210 and the splining of 212 and continue directly to 208.

At 208, the control system 50 may normalize the trajectory for the operation selected at 202. In some embodiments, the trajectory may be normalized such that the start position of the bucket 26 is set to the value of zero (0) and the end position of the bucket 26 is set to the value of one (1). As such, the trajectory is nondimensionalized. The trajectory may advance with each time step from zero to one as will be discussed in detail below.

Next, at 214, the control system 50 may initialize a trajectory parameter (S) associated with the selected operation. In this example, the trajectory parameter (S) may be initialized to the value of zero (0). Moreover, at 214, the control system 50 may initialize the velocity parameter (S') for the selected operation. In some embodiments, the velocity parameter (S') may be initialized to a value of zero (0) or to a non-zero value, depending on whether the bucket 26 is moving in a previous operation (as determined in 206).

Next, the method 200 may continue at 216. At 216, the control system 50 may proceed through a trajectory following process (i.e., a path following process). In general, the control system 50 may generate and send control signals to the actuators 33 for moving the bucket 26 through the trajectory away from the start position and toward the end position. In some embodiments, the control system 50 may retrieve path kinematics data 218 from the memory element 54 and rely on this data to complete the trajectory following process of 216. For example, the kinematics data 218 may be a lookup table showing a relationship between actuator velocities and positions of the bucket 26. The kinematics data 218 may also be an algorithm representing the kinematics of the bucket 26. The trajectory following process of 216 is explained below in detail according to example embodiments illustrated in FIG. 4.

As shown in FIG. 3, the method 200 may continue at 220. At 220, the control system 50 may determine whether to loop back to 216 for additional cycles of the trajectory following process of 216 or whether to exit the loop. This determination will be explained in greater detail below as it may be a result of the trajectory following process of 216. Once the operation is complete and the bucket 26 has reached the end position of the trajectory, the control system 50 may determine that the loop should be exited, and the method 200 may continue to 222.

At 222, the processor 52 may determine whether there is another operation to perform. If there is (affirmative determination at 222), then, the method 200 may loop back to 202. If there are no further operations (negative determination at 222), then the method 200 may terminate.

Figure 4:
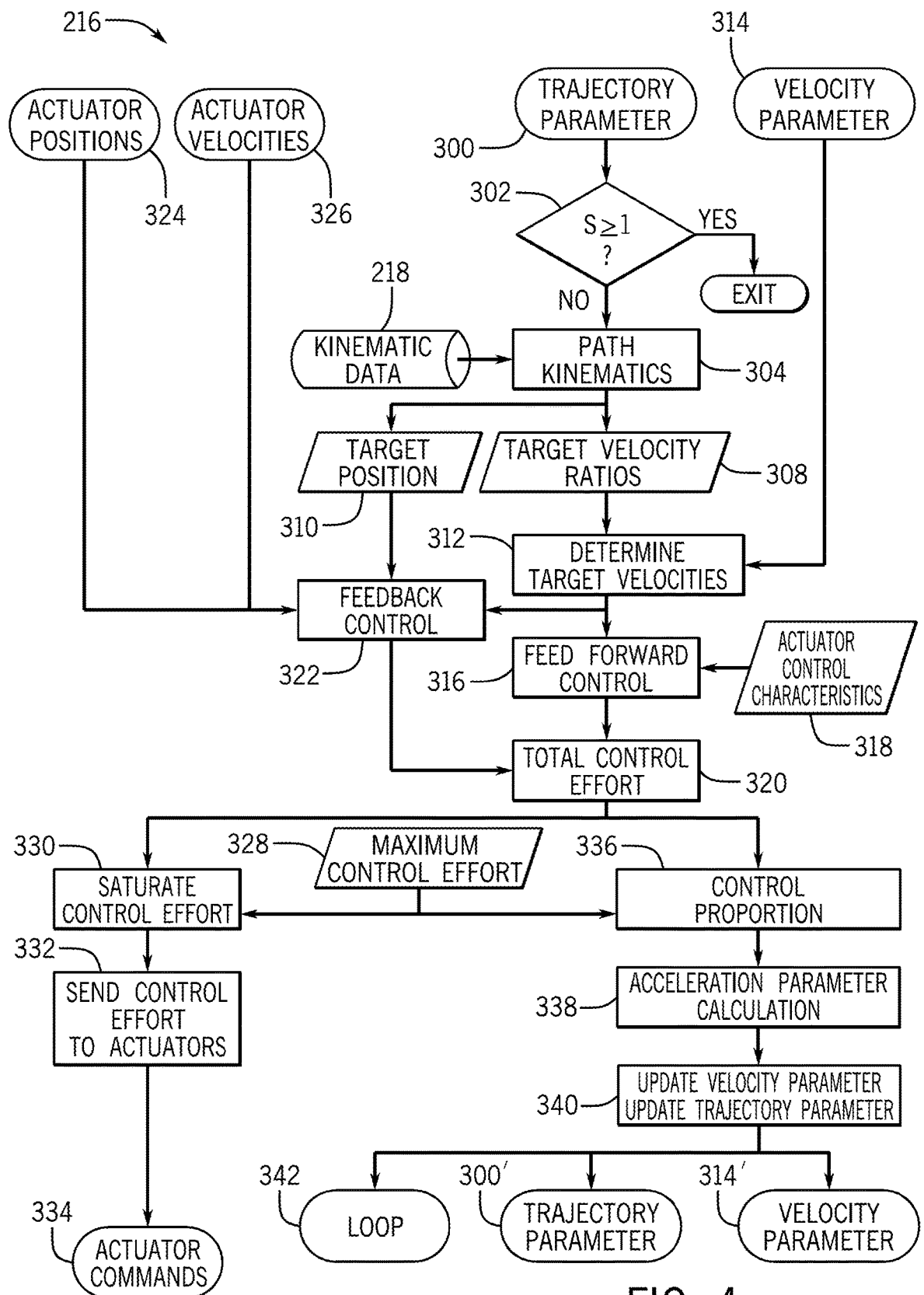
FIG. 4 is a flowchart illustrating a method of controlling the work vehicle according to example embodiments of the present disclosure.

Referring now to FIG. 4, the trajectory following process of 216 of FIG. 3 will be discussed in greater detail. The trajectory following process of 216 may begin at 300, at which the trajectory parameter (S) is received by the processor 52. For example, the trajectory parameter (S) may have the value of zero (S=0) since it has been initialized at 214 of FIG. 3.

The process 216 may continue at 302, at which the processor 52 may determine whether the trajectory parameter 300 is greater than or equal to the value of one (S≥1). If the trajectory parameter is greater than or equal to 1 (affirmative determination), the process 216 may terminate. If not (negative determination), then the process 216 may continue at 304.

At 304, the processor 52 may determine path kinematics for the bucket 26. The processor 52 may rely on path kinematics data 218 stored in the memory element 54 to make this determination. The kinematics data 218 may include a lookup table relating actuator velocities to positions of the bucket 26, an algorithm for calculating kinematics of the bucket 26, etc. The processor 52 may utilize these path kinematics determined at 304 to determine desired positions for the bucket 26 (at 310). Also, the processor 52 may utilize the path kinematics to determine velocity ratios for the actuators 33 (at 308). In some embodiments, the path kinematics may be utilized for providing feedforward control and/or feedback control. In the illustrated embodiment, for example, both feedforward and feedback control is employed.

At 308, the processor 52 may determine the different velocity ratios between the different actuators 33. The different velocity ratios may be obtained according to the path kinematics of 304. Then, at 312, the processor 52 may calculate the target velocities of the actuators 33. This may correspond to 105 of the method 100 of FIG. 2 as discussed above. In some embodiments, at 312, the processor 52 may calculate the target velocities according to the velocity ratios determined at 308 and according to the velocity parameter (S') 314. As mentioned above, the velocity parameter (S') 314 may be initialized at 214 in FIG. 3. This initialized velocity parameter (S') 314 may be input to the processor 52 so that the target velocities for the actuators 33 may be determined at 312 of FIG. 4. The processor 52 may utilize the target velocities for feedforward control and/or feedback control. In the illustrated embodiment, for example, the target velocities determined at 312 are utilized for both feedforward control and feedback control.

Figure 6:
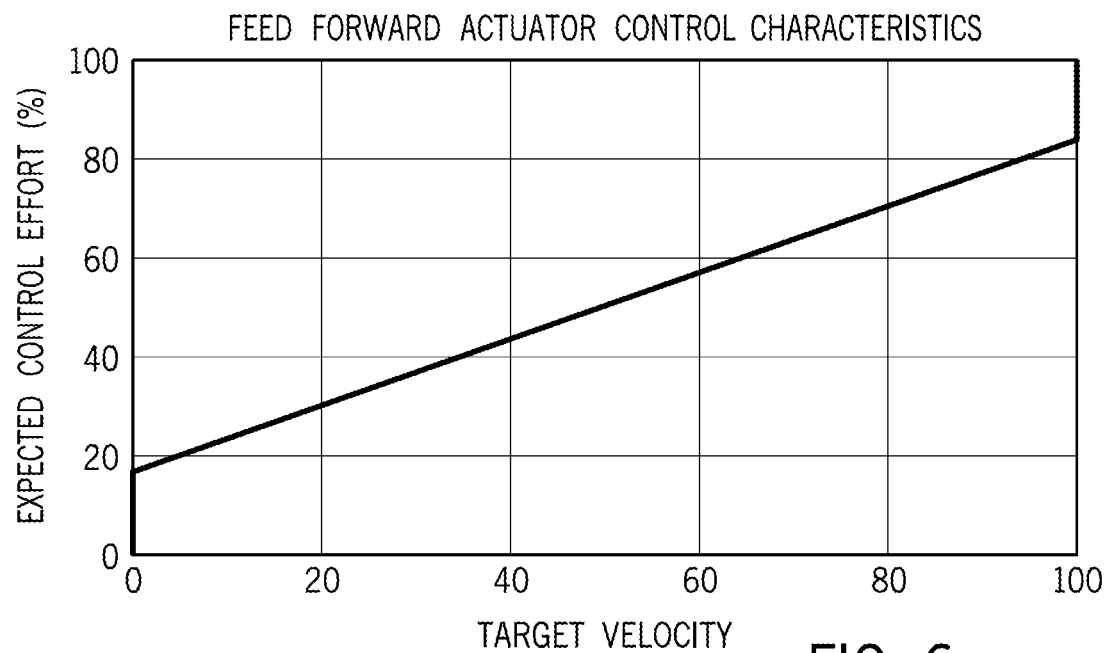
FIG. 6 is a plot illustrating an example relationship between actuator target velocity and expected control effort for the actuator.

More specifically, at 316, the processor 52 may determine a feedforward control effort for the actuators 33. In some embodiments, the feedforward control effort may be determined based on actuator control characteristics 318 stored within the memory element 54. For example, the actuator control characteristics 318 may comprise a stored dataset, graph, table, etc., such as the plot shown in FIG. 6, which demonstrates a linear, directly proportional relationship between the target actuator velocity (horizontal axis) and the expected control effort (vertical axis). Thus, at 316, the processor 52 may use the target velocity (determined at 312) and find the corresponding expected control effort for that particular actuator. It will be appreciated that the plot of FIG. 6 is just one example and that the memory element 54 may include other datasets correlating target velocity to the expected control effort for the different actuators 33.

As stated, feedback control may also be employed for controlling the actuators 33. For example, at 310 of FIG. 4, the processor 52 may determine target positions of the actuators 33. The target positions may be determined from the path kinematics of 304. Then, at 322, the processor 52 may receive feedback signals from the sensors 41. The feedback signals may correspond to the actual positions 324 and/or actual velocities 326 of the actuators 33. The processor 52 may compare the actual positions to the target positions, determine the difference (error), and generate a feedback control effort for the actuators 33 based on the comparison. In addition, in some embodiments of 322, the processor 52 may compare the actual velocities to the target velocities, determine the difference (error), and generate a corresponding feedback control effort for the actuators 33.

The feedforward control effort determined at 316 and the feedback control effort 322 may be processed together by the processor 52 at 320 to produce a total control effort. In some embodiments, the processor 52 may calculate the total control effort according to programmed logic, an algorithm, etc.

In some cases, the process 216 may continue at 330. Specifically, the total control effort (determined at 320) for each actuator 33 may be compared to a predetermined maximum control effort 328 (a control effort upper limit) for the actuators 33. For each actuator 33 involved in the operation, the processor 52 may access the maximum control effort 328 stored in the memory element 54, and compare it to the total control effort determined at 320. It is noted that this may be a fixed limit that applies for multiple (e.g., all) operations, or this upper limit may be different for different operations. Also, the processor 52 may obtain the limit from the memory element 54 or the processor 52 may determine the limit based on a lookup table, an algorithm, or another way. Based on the comparison at 320, the processor 52 may saturate the control effort to a maximum control effort at 330. Then, the processor 52 may generate actuator control commands corresponding to the saturated control effort, and send those control commands to the actuators 33 at 334. It is noted that the total control effort (determined at 320) may exceed the predetermined maximum control effort 328, for example, if the target velocity is unattainable or if the feed forward control is close to the limit and the feedback control effort is also high. In these cases, the control commands sent to the actuators 33 at 334 are saturated to the maximum control effort.

In other cases, at 336, the processor 52 may calculate the control proportion of the actuators 33 (similar to 110 of FIG. 2). The maximum control effort 328 for each actuator 33 may be supplied to the processor 52 from the memory element 54. For each actuator 33, the processor 52 may compare the total control effort (determined at 320) with the maximum control effort 328.

Then, the processor 52 may calculate the acceleration parameter (S") at 338. The processor 52 may calculate the acceleration parameter (S") as discussed above with respect to 118, 124, and 126 of FIG. 2. Also, 388 of the process 216 may occur according to FIG. 5, which will be discussed in detail below.

Next, at 340, the processor 52 may update the velocity parameter (S') according to the acceleration parameter (S") calculated at 338. Additionally, the processor 52 may update the trajectory parameter (S) and the velocity parameter (S') according to the acceleration parameter (S") calculated at 338. The process 216 may then loop and repeat at 342 with the updated trajectory parameter 300' serving as input for 318 of the process 216 and with the updated velocity parameter 314' serving as input for 312 of the process 216. In some embodiments, the processor 52 may generate control signals for the actuators 33 such that the bucket 26 follows a path. The processor 52 may actuate each actuator 33 according to the path given by:

$$S_{n+1} = S_n + S'(\text{time step}) \quad (3)$$

where $S_n$ is the trajectory parameter during the previous time step and $S_{n+1}$ is the trajectory parameter during the subsequent time step.

In some embodiments, the processor 52 may generate commands for the actuators 33 according to the following equation:

$$\text{Position} = P_{START} + S_{n+1}(P_{END} - P_{START}) \quad (4)$$

where $P_{START}$ is the position of the actuator at the beginning of the timestep and $P_{END}$ is the position of the actuator at the end of the timestep. Accordingly, using the trajectory parameter, synchronous motion of the actuators may be nondimensionalized and parameterized. It will be appreciated that the commands may be generated in a different way without departing from the scope of the present application. For example, instead of the linear equation (4), above, the processor 52 may generate the control commands for the actuators 33 according to a quadratic equation as follows:

$$\text{Position} = P_{START} + S_{n+1}^2(P_{END} - P_{START}) \quad (5)$$

Furthermore, instead of the quadratic equation (5), above, the processor 52 may generate the control commands for the actuators 33 according to a cycloidal equation as follows:

$$\text{Position} = P_{START} + (1 - \cos((\pi/2)S_{n+1}))) * (P_{END} - P_{START}) \quad (6)$$

In addition, the processor 52 may generate control commands according to the following equation:

$$\text{Velocity} = VR * S' \quad (7)$$

where VR is the velocity ratio determined at 308.

As discussed with respect to FIG. 3, the method 200 may loop through the process 216 until the processor 52 determines (at 220) that the operation is completed (i.e., S=1 and the bucket 26 is at its end position).

Figure 5:
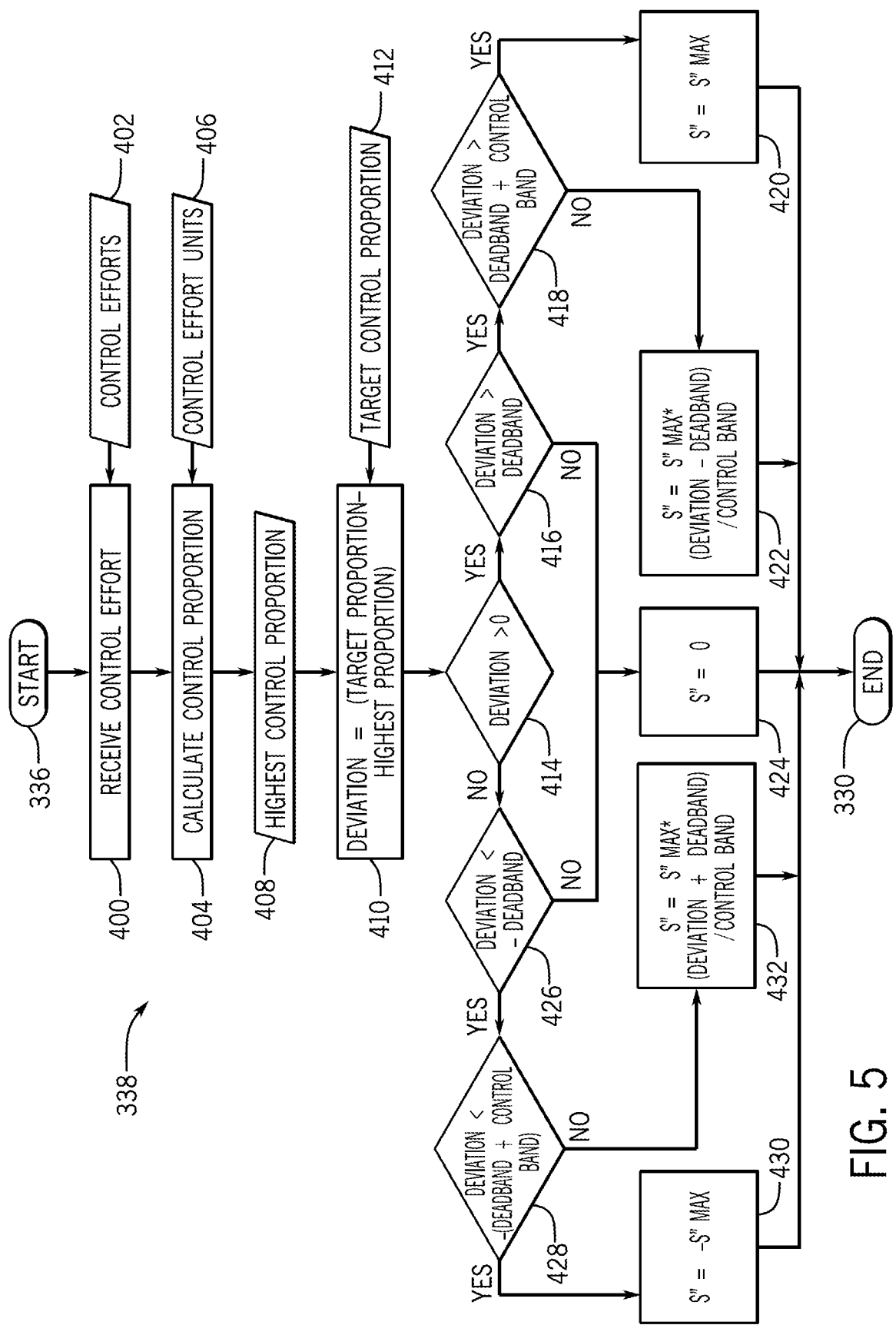
FIG. 5 is a flowchart illustrating a method of controlling the work vehicle according to example embodiments of the present disclosure.

Referring now to FIG. 5, the process 338 of determining the acceleration parameter (S") will be discussed according to example embodiments. As will be discussed, the acceleration parameter (S") may be calculated such that the maximum controller command is maintained within the control deadband.

The process 338 may begin at 400, wherein the processor 52 may receive control efforts 402 for the different actuators 33. This may correspond to 108 of FIG. 2 as discussed above.

Then, at 404, the processor 52 may calculate the control proportion for the different actuators 33. As discussed above with respect to 110 in FIG. 2, the processor 52 may receive the control effort limits 406 from the memory element 554, divide the actual control effort for an actuator by its maximum control effort to determine its control proportion. This calculation may be performed for each actuator 33.

Next, at 408, the processor 52 may identify the highest control proportion for the "limiting actuator" (i.e., the actuator moving closest to its capacity). Then, at 410, the processor 52 may receive a target control proportion 412 from the memory element 54. At 410 the processor 52 may subtract the highest control proportion (identified at 408) from the target control proportion 412 to calculate a deviation from the target control proportion. This calculation may be equivalent to determining whether the highest control proportion is within the predetermined threshold as discussed with respect to 114 and/or 116 of FIG. 2.

Then, as with FIG. 2, the acceleration parameter (S") may be determined as a function of the calculated deviation (calculated at 410). In the embodiment of FIG. 5, the processor 52 relies on a programmed algorithm to determine the acceleration parameter (S"). This logic may be represented in the plot of FIG. 7, which illustrates the relationship between the deviation (determined at 410) and the corresponding acceleration parameter (S"). Deadbands and control bands for positive and negative deviations are also indicated. As shown, the function saturates to the maximum acceleration (either positive or negative) when deviation is high. Also, there is a control band where there is a directly proportional relationship between deviation and acceleration parameter (S"). Furthermore, there may be a deadband in the central region. It will be appreciated that this is but one example plot and that the logic/function may vary from the illustrated example.

Specifically, at 414 of the process 338, the processor 52 may determine whether the deviation (determined at 410) is greater than zero. If so (affirmative determination at 414), then the process 338 may continue to 416, at which the processor 52 may determine whether the deviation (determined at 410) is greater than the positive control deadband. If so (affirmative determination at 416), then the process 338 may continue to 418, at which the processor 52 may determine whether the deviation is greater than the sum of the positive deadband and the control band. If so (affirmative determination at 418), then the processor 338 may continue to 420, wherein the processor 52 determines that the acceleration parameter (S") is equal to a predetermined maximum. For example, using the example of FIG. 7, this would be the case with deviations of fifteen and above.

If there is a negative determination at 418, however, the process 338 may continue to 422. At 422, the processor 52 may calculate the acceleration parameter (S") according to:

$$S''=S''_{MAX}(\text{DEV}-\text{Deadband})/\text{ControlBand} \quad (8)$$

wherein $S''_{MAX}$ is a predetermined maximum acceleration parameter, and DEV is deviation determined at 410. Using the example of FIG. 7, this would be the case with deviations between five and fifteen.

Also, if there is a negative determination at 416, the process 338 may continue to 424. At 424, the processor 52 may determine the acceleration parameter (S") as equal to zero so that there is no acceleration and the current actuator velocities are maintained. According to FIG. 7, this may occur if the deviation is between zero and five.

Figure 7:
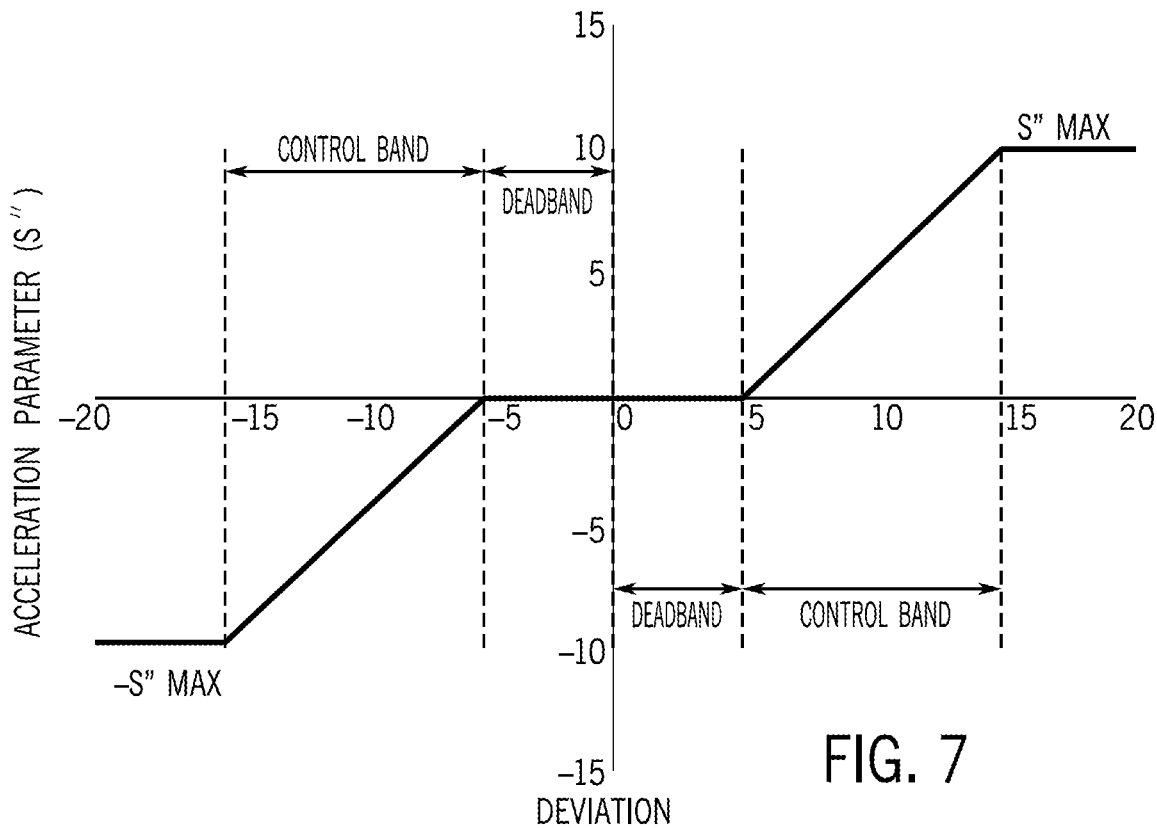
FIG. 7 is a plot illustrating an example relationship between control effort deviation and an acceleration parameter.

In addition, if there is a negative determination at 414, then the process 338 may continue to 426. At 426, the processor 52 may determine whether the deviation (determined at 410) is less than the negative deadband. If not (negative determination at 426), then the processor 52 may proceed to 424 and determine the acceleration parameter (S") as equal to zero. As shown in FIG. 7, this may occur if the deviation is between zero and negative five.

Moreover, if there is a positive determination at 426, then the process 338 may continue at 428. At 428, the processor 52 may determine whether the deviation (determined at 410) is less than a sum of the negative deadband and the negative control band.

If not (negative determination at 428), then the process 338 may continue to 432. At 432, the processor 52 may calculate the acceleration parameter (S") according to:

$$S''=S''_{MAX}(\text{DEV}+\text{Deadband})/\text{ControlBand} \quad (9)$$

Using the example of FIG. 7, this would be the case with deviations between negative five and negative fifteen. It is noted that the acceleration parameter (S") would have a negative value in this example, meaning that the actuator 33 would slow down and decelerate.

If there is a positive determination at 428, then the process 338 may continue to 430. At 430, the processor 52 may determine that the acceleration parameter (S") is equal to a predetermined negative maximum. For example, using the example of FIG. 7, this would be the case with deviations of negative fifteen and below. This would cause the actuator 33 to decelerate and slow down.

After 430 (as well as after 432, 424, 422, and 420), the process 338 may terminate. In some embodiments, 340 of FIG. 4 may commence, and the processor 52 may update the velocity parameter and the trajectory parameter.

It will be appreciated that the actuator parameter (S") may be determined in other ways as well. For example, S" may be calculated according to the following function:

$$S''=S''_{MAX}(2/\pi)(\arctan(\text{GAIN}\times\text{DEV})) \quad (10)$$

where GAIN is a predetermined constant relating actuator target velocity and the velocity parameter (S').

Figure 8:
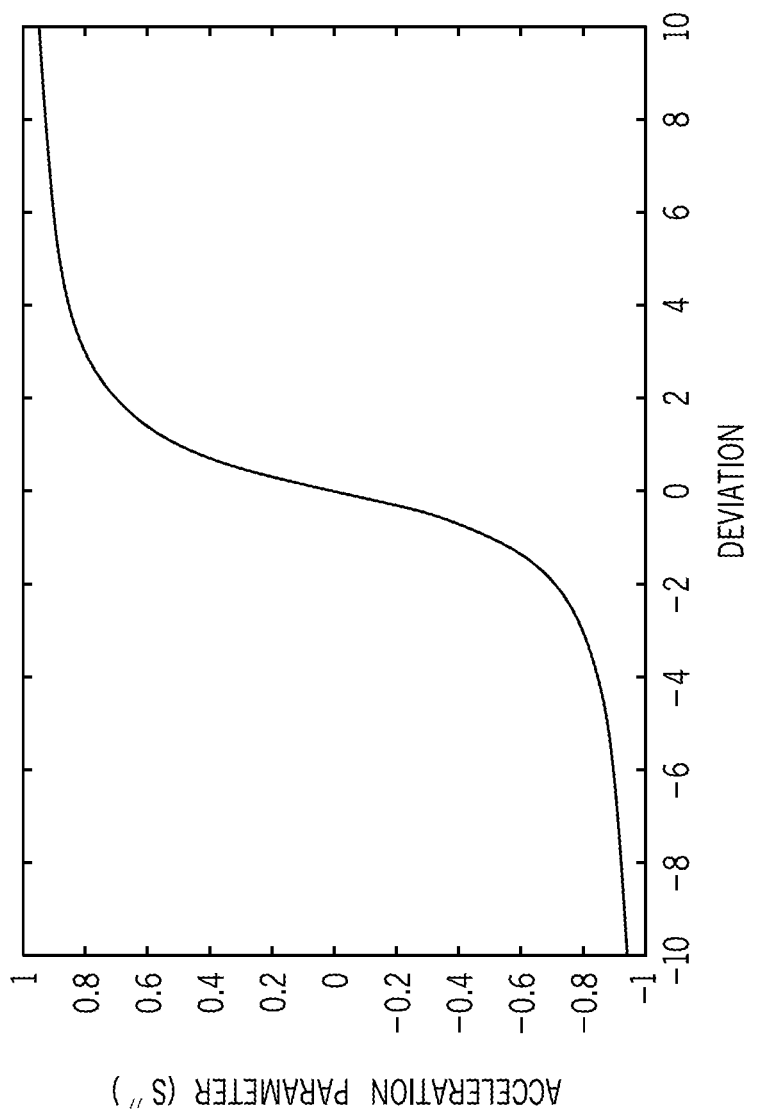
FIG. 8 is a plot illustrating an example relationship between control effort deviation and an acceleration parameter according to additional embodiments of the present disclosure.

This relationship is illustrated in FIG. 8 according to example embodiments. In this illustrated example, GAIN is equal to one and $S''_{MAX}$ is equal to one. These values may be different in other embodiments. For example, the value of GAIN may be adjusted to change the relationship. Lower GAIN values provide a wider transition between the positive and negative deviation values, and higher GAIN values provide a narrower transition.

Accordingly, the control system and control methods of the present disclosure may allow the work vehicle 10 to operate efficiently and accurately to perform various operations. This may facilitate manual control of the work vehicle 10 and/or autonomous control of the work vehicle 10.

Furthermore, it will be appreciated that the control system of the present disclosure and its methods of operation may be advantageously scalable between different work vehicles 10. For example, the selectable trajectories, the associated velocity ratios and/or other associated data, etc. may be scaled for different work vehicles of different proportional sizes and configurations.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the following examples are provided, which are numbered for easier reference.

1. A method of synchronously operating a plurality of actuators of a work vehicle to move an implement, the method comprising: receiving, by a processor of a control system of the work vehicle, an operation selection, the operation selection corresponding to a movement of the implement from a start position to an end position, and the operation selection having an associated set of velocity ratios dictating relative velocities of the plurality of actuators; actuating, by the processor, the plurality of actuators according to a first plurality of control signals for a first time step, the first plurality of control signals based at least in part on the set of velocity ratios; determining, by the processor, a limiting one of the plurality of actuators for the first time step, the limiting one determined according to a control effort proportion; determining, by the processor, an acceleration parameter for the limiting one of the plurality of actuators; and actuating, by the processor, the plurality of actuators according to a second plurality of control signals for a second time step, the second plurality of control signals based at least in part on the acceleration parameter.

2. The method of example 1, wherein determining the limiting one includes determining the control effort proportion for each of the plurality of actuators for the first time step, the limiting one having the highest of the control effort proportions.

3. The method of example 2, further comprising determining the control effort proportion for the limiting one including: receiving, by the processor from a memory element, a predetermined control effort upper limit; and calculating, by the processor, the control effort proportion for the limiting one as a control effort for the limiting one during the first time step divided by the predetermined control effort upper limit.

4. The method of example 3, further comprising determining, for the limiting one, a deviation of the control effort from the predetermined control effort upper limit; and wherein determining the acceleration parameter includes determining the acceleration parameter based at least partly on the deviation.

5. The method of example 4, further comprising determining whether the determined deviation is greater than zero; and further comprising determining whether the determined deviation is greater than a Deadband; wherein, when the determined deviation is greater than zero and greater than the Deadband, determining the acceleration parameter includes determining the acceleration parameter ($S''$) according to: $S''=S''_{MAX}(DEV-Deadband)/ControlBand$ where $S''_{MAX}$ is a predetermined maximum acceleration parameter, and DEV is the determined deviation.

6. The method of example 5, further comprising determining whether the determined deviation is less than a negative Deadband; wherein, when the determined deviation is less than zero and greater than the negative Deadband, determining the acceleration parameter includes determining the acceleration parameter ($S''$) according to: $S''=S''_{MAX}(DEV+Deadband)/ControlBand$.

7. The method of example 4, wherein determining the acceleration parameter includes determining the acceleration parameter ($S''$) according to: $S''=S''_{MAX}(2/pi)(arctan(GAIN \times DEV))$ where $S''_{MAX}$ is a predetermined maximum acceleration parameter, and DEV is the determined deviation.

8. The method of example 4, further comprising generating, by the processor, the second plurality of control signals including generating a saturated control signal when the deviation exceeds a predetermined limit.

9. The method of example 1, wherein the set of velocity ratios remains constant for the second time step; and further comprising generating, by the processor, the second plurality of control signals based at least partly on the determined acceleration parameter and the set of velocity ratios.

10. The method of example 1, further comprising receiving, by the processor, path kinematics data associated with the operation selection; and further comprising determining, by the processor, the set of velocity ratios based on the received path kinematics.

11. The method of example 1, further comprising determining a target velocity for one of the plurality of actuators; further comprising determining a feed forward control effort according the determined target velocity; further comprising comparing the feed forward control effort to a predetermined control effort upper limit for the one of the plurality of actuators; and further comprising determining the control effort proportion for the one of the plurality of actuators based at least partly on the comparison of the feed forward control effort and the predetermined control effort upper limit.

12. The method of example 1, further comprising receiving, by the processor, a feedback signal from a sensor corresponding to an actual condition of one of the plurality of actuators for the first time step; further comprising determining an error between the actual condition and a predetermined target condition; further comprising determining the control effort proportion for the one of the plurality of actuators based at least partly on the determined error.

13. A work vehicle comprising: a plurality of actuators; an implement; and a control system configured to selectively actuate the plurality of actuators in synch to move the implement, the control system configured to: receive an operation selection, the operation selection corresponding to a movement of the implement from a start position to an end position, and the operation selection having an associated set of velocity ratios dictating relative velocities of the plurality of actuators; actuate the plurality of actuators according to a first plurality of control signals for a first time step, the first plurality of control signals based at least in part on the set of velocity ratios; determine a limiting one of the plurality of actuators for the first time step, the limiting one determined according to a control effort proportion; determine an acceleration parameter for the limiting one of the plurality of actuators; and actuate the plurality of actuators according to a second plurality of control signals for a second time step, the second plurality of control signals based at least in part on the acceleration parameter.

14. The work vehicle of example 13, wherein the control system is configured to determine the limiting one by determining the control effort proportion for each of the plurality of actuators for the first time step, the limiting one having the highest of the control effort proportions.

15. The work vehicle of example 14, wherein the control system is configured to determine the control effort proportion for the limiting one by: receiving a predetermined control effort upper limit; and calculating the control effort proportion for the limiting one as a control effort for the limiting one during the first time step divided by the predetermined control effort upper limit.

16. The work vehicle of example 15, wherein the control system is configured to determine, for the limiting one, a deviation of the control effort from the predetermined control effort upper limit; and wherein the control system is configured to determine the acceleration parameter based at least partly on the deviation.

17. The work vehicle of example 13, wherein at least some of the plurality of actuators are hydraulic actuators.

18. A method of performing an operation with a work vehicle having an implement comprising: generating, by a processor of a control system, a first control signal for a first actuator and a second control signal for a second actuator for a first time step of the operation; actuating the first actuator according to the first control signal and the second actuator according to the second control signal for the first time step; determining, by the processor, a first control effort associated with the first control signal for the first time step; determining, by the processor, a second control effort associated with the second control signal for the first time step; determining, by the processor, a first control proportion of the first time step for the first actuator and a second control proportion of the first time step for the second actuator, the first control proportion being the determined first control effort divided by a predetermined first limit of the first actuator, the second control proportion being the determined second control effort divided by a predetermined second limit of the second actuator; determining, by the processor, an acceleration parameter according to a greater one of the first control proportion and the second control proportion; generating, by the processor, a first augmented control signal for the first actuator and a second augmented control signal for the second actuator based at least partly on the determined acceleration parameter; and actuating the first actuator according to the first augmented control signal for the second time step; and actuating the second actuator according to the second augmented control signal for the second time step.

19. The method of example 18, further comprising determining a deviation of the greater one of the first control proportion from a predetermined target control proportion; and wherein determining the acceleration parameter includes determining the acceleration parameter according to the determined deviation.

20. The method of example 19, further comprising receiving, by the processor, an operation selection corresponding to a movement of the implement from a start position to an end position; further comprising receiving, by the processor, path kinematics data associated with the operation selection for the first time step; wherein the control system is configured to receive a set of velocity ratios for the first and second actuators based on the received path kinematics; and wherein generating the first control signal and the second control signal for the first time step includes generating the first and second control signals according to the received set of velocity ratios.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method of synchronously operating a plurality of actuators of a work vehicle to move an implement, the method comprising:
   receiving, by a processor of a control system of the work vehicle, an operation selection, the operation selection corresponding to a movement of the implement from a start position to an end position, and the operation selection having an associated set of velocity ratios dictating relative velocities of the plurality of actuators;
   actuating, by the processor, the plurality of actuators according to a first plurality of control signals for a first time step, the first plurality of control signals based at least in part on the set of velocity ratios;
   determining, by the processor, a limiting one of the plurality of actuators for the first time step, the limiting one determined according to a control effort proportion;
   determining, by the processor, an acceleration parameter for the limiting one of the plurality of actuators; and
   actuating, by the processor, the plurality of actuators according to a second plurality of control signals for a second time step, the second plurality of control signals based at least in part on the acceleration parameter.

2. The method of claim 1, wherein determining the limiting one includes determining the control effort proportion for each of the plurality of actuators for the first time step, the limiting one having the highest of the control effort proportions.

3. The method of claim 2, further comprising determining the control effort proportion for the limiting one including:
   receiving, by the processor from a memory element, a predetermined control effort upper limit; and
   calculating, by the processor, the control effort proportion for the limiting one as a control effort for the limiting one during the first time step divided by the predetermined control effort upper limit.

4. The method of claim 3, further comprising determining, for the limiting one, a deviation of the control effort from the predetermined control effort upper limit; and
   wherein determining the acceleration parameter includes determining the acceleration parameter based at least partly on the deviation.

5. The method of claim 4, further comprising determining whether the determined deviation is greater than zero; and
   further comprising determining whether the determined deviation is greater than a Deadband;
   wherein, when the determined deviation is greater than zero and greater than the Deadband, determining the acceleration parameter includes determining the acceleration parameter (S″) according to:

$$S''=S''_{MAX}(\text{DEV}-\text{Deadband})/\text{ControlBand}$$

where $S''_{MAX}$ is a predetermined maximum acceleration parameter, and DEV is the determined deviation.

6. The method of claim 5, further comprising determining whether the determined deviation is less than a negative Deadband;
   wherein, when the determined deviation is less than zero and greater than the negative Deadband, determining the acceleration parameter includes determining the acceleration parameter (S″) according to:

$$S''=S''_{MAX}(\text{DEV}+\text{Deadband})/\text{ControlBand}.$$

7. The method of claim 4, wherein determining the acceleration parameter includes determining the acceleration parameter (S″) according to:

$$S''=S''_{MAX}(2/\pi)(\arctan(\text{GAIN}\times\text{DEV}))$$

where $S''_{MAX}$ is a predetermined maximum acceleration parameter, and DEV is the determined deviation.

8. The method of claim 4, further comprising generating, by the processor, the second plurality of control signals including generating a saturated control signal when the deviation exceeds a predetermined limit.

9. The method of claim 1, wherein the set of velocity ratios remains constant for the second time step; and
   further comprising generating, by the processor, the second plurality of control signals based at least partly on the determined acceleration parameter and the set of velocity ratios.

10. The method of claim 1, further comprising receiving, by the processor, path kinematics data associated with the operation selection; and
    further comprising determining, by the processor, the set of velocity ratios based on the received path kinematics.

11. The method of claim 1, further comprising determining a target velocity for one of the plurality of actuators;

further comprising determining a feed forward control effort according the determined target velocity;

further comprising comparing the feed forward control effort to a predetermined control effort upper limit for the one of the plurality of actuators; and further comprising determining the control effort proportion for the one of the plurality of actuators based at least partly on the comparison of the feed forward control effort and the predetermined control effort upper limit.

12. The method of claim 1, further comprising receiving, by the processor, a feedback signal from a sensor corresponding to an actual condition of one of the plurality of actuators for the first time step;

further comprising determining an error between the actual condition and a predetermined target condition;

further comprising determining the control effort proportion for the one of the plurality of actuators based at least partly on the determined error.

13. A work vehicle comprising:
a plurality of actuators;
an implement; and
a control system configured to selectively actuate the plurality of actuators in synch to move the implement, the control system configured to:
receive an operation selection, the operation selection corresponding to a movement of the implement from a start position to an end position, and the operation selection having an associated set of velocity ratios dictating relative velocities of the plurality of actuators;
actuate the plurality of actuators according to a first plurality of control signals for a first time step, the first plurality of control signals based at least in part on the set of velocity ratios;
determine a limiting one of the plurality of actuators for the first time step, the limiting one determined according to a control effort proportion;
determine an acceleration parameter for the limiting one of the plurality of actuators; and
actuate the plurality of actuators according to a second plurality of control signals for a second time step, the second plurality of control signals based at least in part on the acceleration parameter.

14. The work vehicle of claim 13, wherein the control system is configured to determine the limiting one by determining the control effort proportion for each of the plurality of actuators for the first time step, the limiting one having the highest of the control effort proportions.

15. The work vehicle of claim 14, wherein the control system is configured to determine the control effort proportion for the limiting one by:
receiving a predetermined control effort upper limit; and
calculating the control effort proportion for the limiting one as a control effort for the limiting one during the first time step divided by the predetermined control effort upper limit.

16. The work vehicle of claim 15, wherein the control system is configured to determine, for the limiting one, a deviation of the control effort from the predetermined control effort upper limit; and wherein the control system is configured to determine the acceleration parameter based at least partly on the deviation.

17. The work vehicle of claim 13, wherein at least some of the plurality of actuators are hydraulic actuators.

18. A method of performing an operation with a work vehicle having an implement comprising:
generating, by a processor of a control system, a first control signal for a first actuator and a second control signal for a second actuator for a first time step of the operation;
actuating the first actuator according to the first control signal and the second actuator according to the second control signal for the first time step;
determining, by the processor, a first control effort associated with the first control signal for the first time step;
determining, by the processor, a second control effort associated with the second control signal for the first time step;
determining, by the processor, a first control proportion of the first time step for the first actuator and a second control proportion of the first time step for the second actuator, the first control proportion being the determined first control effort divided by a predetermined first limit of the first actuator, the second control proportion being the determined second control effort divided by a predetermined second limit of the second actuator;
determining, by the processor, an acceleration parameter according to a greater one of the first control proportion and the second control proportion;
generating, by the processor, a first augmented control signal for the first actuator and a second augmented control signal for the second actuator based at least partly on the determined acceleration parameter; and
actuating the first actuator according to the first augmented control signal for the second time step; and
actuating the second actuator according to the second augmented control signal for the second time step.

19. The method of claim 18, further comprising determining a deviation of the greater one of the first control proportion from a predetermined target control proportion; and wherein determining the acceleration parameter includes determining the acceleration parameter according to the determined deviation.

20. The method of claim 19, further comprising receiving, by the processor, an operation selection corresponding to a movement of the implement from a start position to an end position;
further comprising receiving, by the processor, path kinematics data associated with the operation selection for the first time step;
wherein the control system is configured to receive a set of velocity ratios for the first and second actuators based on the received path kinematics; and
wherein generating the first control signal and the second control signal for the first time step includes generating the first and second control signals according to the received set of velocity ratios.

* * * * *

UNITED STATES PATENT AND TRADEMARK OFFICE
CERTIFICATE OF CORRECTION

PATENT NO. : 10,870,968 B2  
APPLICATION NO. : 15/967031  
DATED : December 22, 2020  
INVENTOR(S) : Michael G. Kean Page 1 of 1

It is certified that error appears in the above-identified patent and that said Letters Patent is hereby corrected as shown below:

In the Claims

In Column 23, Claim 11, Line 2, delete "according the" and insert -- according to the --, therefor.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*